Feb. 16, 1965  C. L. SOLANO VIQUEZ  3,169,792
PICK-UP TRUCK WHICH IS CONVERTIBLE INTO
A PASSENGER VEHICLE
Filed Dec. 6, 1962  2 Sheets-Sheet 1
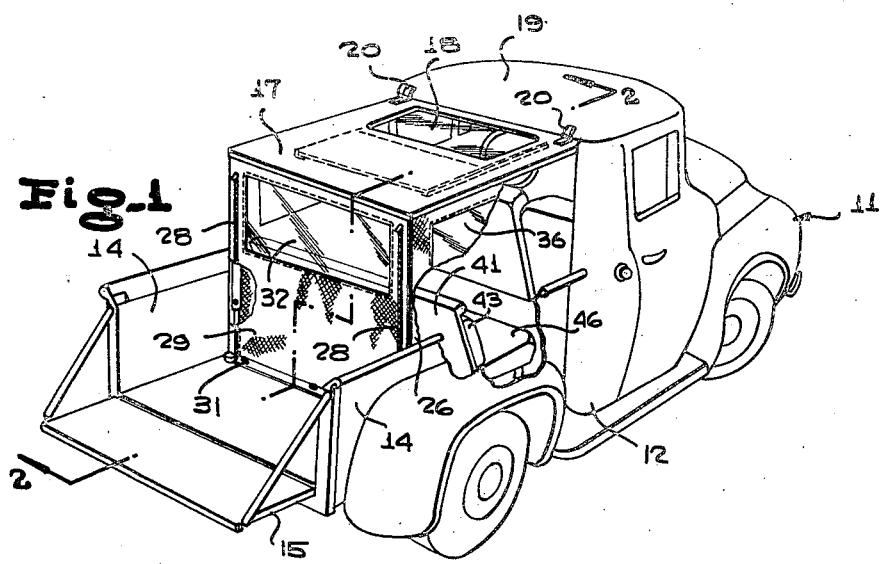
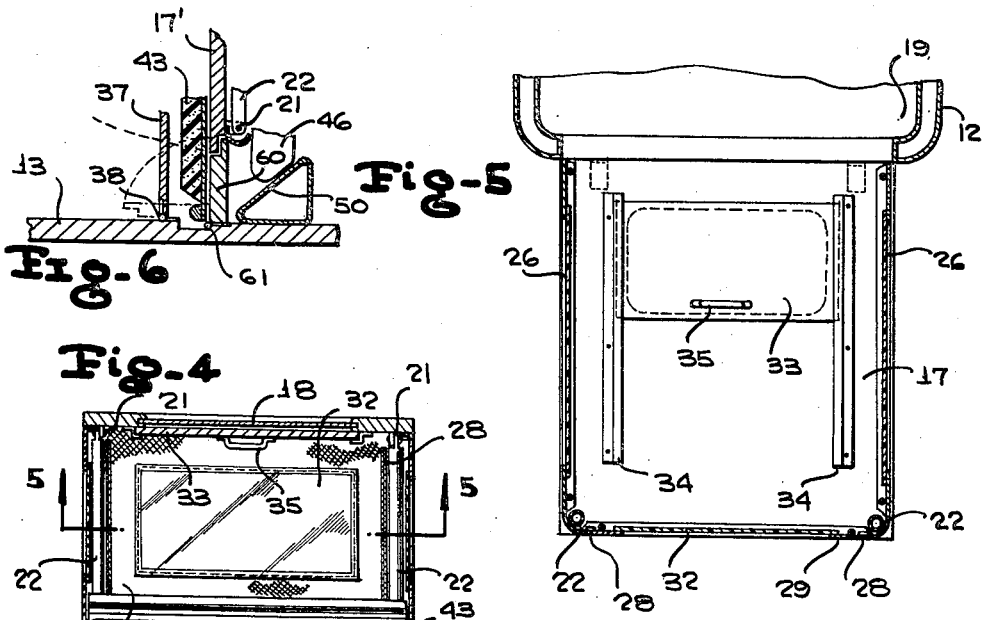
INVENTOR.
CARLOS L. SOLANO-VIQUEZ
BY
Stevens, Davis, Miller & Mosher
ATTORNEYS Feb. 16, 1965    C. L. SOLANO VIQUEZ    3,169,792
PICK-UP TRUCK WHICH IS CONVERTIBLE INTO
A PASSENGER VEHICLE
Filed Dec. 6, 1962    2 Sheets-Sheet 2
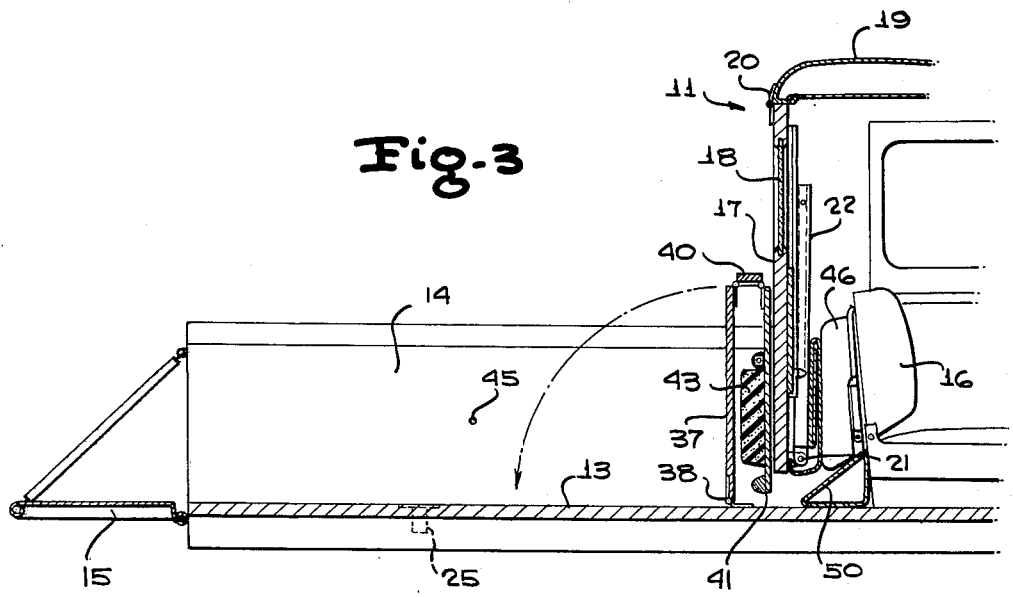
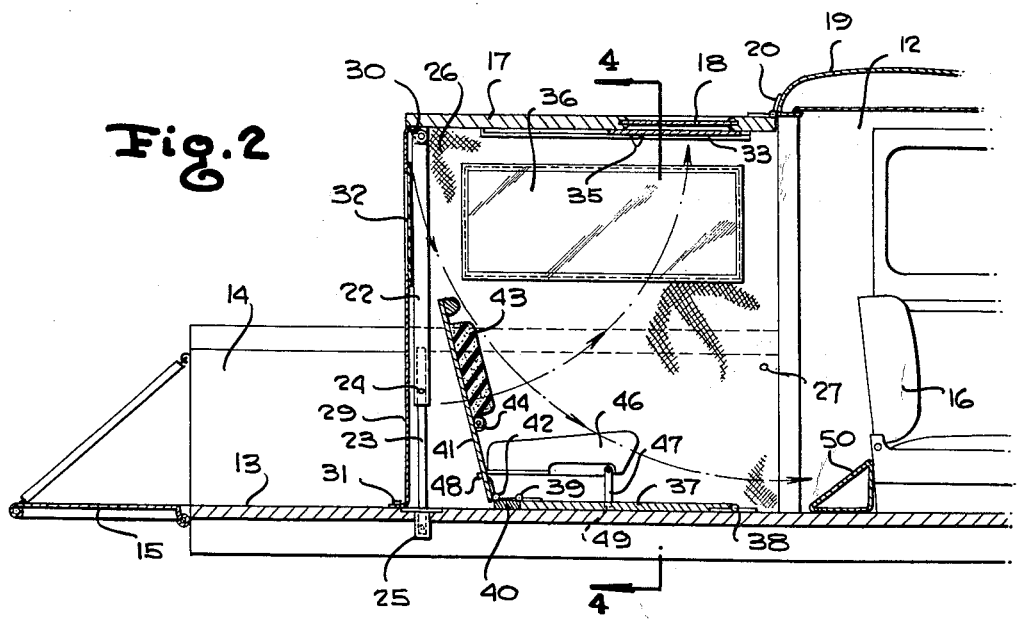
INVENTOR.
CARLOS L. SOLANO-VIQUEZ
BY
Stevens, Davis, Miller & Mosher
ATTORNEYS 3,169,792
PICK-UP TRUCK WHICH IS CONVERTIBLE INTO
A PASSENGER VEHICLE
Carlos L. Solano Viquez, San Vicente de Moravia,
San Jose, Costa Rica
Filed Dec. 6, 1962, Ser. No. 242,698
7 Claims. (Cl. 296—99)

This invention relates to land vehicle bodies, and more particularly to a pick-up truck which is convertible into a passenger vehicle.

A main object of the invention is to provide a novel and improved vehicle which may be employed interchangeably for either freight or passengers.

A further object of the invention is to provide an improved pick-up truck body which is provided with means for quickly and easily converting the body for use to accommodate passengers, said means being relatively simple in construction, being easy to manipulate, and being foldable to a relatively compact size so that there is no interference with the use of the truck body for carrying freight.

A still further object of the invention is to provide an improved convertible pick-up truck body which can be easily and rapidly converted to accommodate passengers, the conversion elements being relatively inexpensive to fabricate, being easy to install, and being durable in construction.

Further objects and advantages of the invention will become apparent from the following description and claims, and from the accompanying drawings, wherein:

FIGURE 1 is a rear perspective view, partly broken away, of a pick-up truck constructed in acordance with the present invention, shown converted for use as a passenger vehicle;

FIGURE 2 is an enlarged fragmentary vertical cross-sectional view taken substantially on the line 2—2 of FIGURE 1;

FIGURE 3 is a vertical cross-sectional view similar to FIGURE 2, but with the conversion elements folded up and arranged so that the truck can be used for hauling freight;

FIGURE 4 is a transverse vertical cross-sectional view taken substantially on the line 4—4 of FIGURE 2;

FIGURE 5 is a horizontal cross-sectional view taken substantially on the line 5—5 of FIGURE 4;

FIGURE 6 is a fragmentary vertical cross-sectional view showing a modification of the present invention.

Referring to the drawings, 11 generally designates a pick-up truck having a cab 12 and having a rearwardly extending horizontal floor 13. The body of the truck is provided with the upstanding longitudinal side walls 14, 14 and with the conventional hinged rear tail gate 15.

The cab 12 is provided with a conventional front seat assembly which may be either of the forwardly movable type or of the type having pivoted seat backs 16 which may be swung forwardly at times.

The cab 12 is provided with a hinged rear wall 17, which comprises a generally rectangular rigid member provided at its upper portion with a window 18. The rear wall 17 is hinged to the rear transverse edge of the cab roof 19 by a pair of hinges 20, 20 connecting the top corner portions of the rectangular wall 17 to the end portions of the rear transverse edge of roof 19. As shown in FIGURE 3, the rear wall 17 is normally in a depending vertical position, substantially closing off the rear portion of cab 12. The wall 17 may be swung rearwardly to a substantially horizontal position overlying the truck floor 13, whereby it defines the roof of an auxiliary passenger compartment, as will be presently described.

Hingedly connected at 21, 21 to the lower corner portions, as viewed in FIGURE 3, of the wall 17 are respective tubular post members 22, 22 provided with telescoping extension rods 23 which may be locked in extended positions by set screws 24 provided in the post members 22. The outer ends of rods 23 are receivable in respective vertical sockets 25 provided in the truck floor 13, as shown in FIGURE 2, whereby to support the wall 17 in a horizontal position.

Respective flexible side walls 26, 26 of canvas, or the like, are secured to the side edges of the rigid wall member 17, and are detachably secured by means of conventional snap fasteners 27 to the inside of the vertical walls 14, 14 of the truck body. The flexible side walls 26 are shaped to extend around the vertical post assemblies 22, 23 and are detachably connected by respective slide fastener assemblies 28, 28 to a flexible rear wall 29 secured at 30 to the free transverse margin of the rigid wall member 17. The bottom marginal portion of the flexible rear wall 29 is detachably secured, as by snap fasteners 31 to the truck floor 13. Flexible rear wall 29 may comprise canvas, or the like, and is provided with a window 32 of suitable transparent material, located in the upper portion of the flexible rear wall.

The rigid wall member 17 is smaller in width than the cab roof 19 by an amount such that the flexible side walls 26, 26 will be received inside the vertical longitudinal side walls 14, 14 of the truck body.

Secured to the inside surface of wall member 17 are a pair of opposing parallel generally Z-shaped guide bars 34, 34 between which is slidably received a rectangular opaque cover plate 33. The guide bars 34, 34 are located on opposite sides of the window 18, and the cover plate is movable to a position covering the window 18, as shown in FIGURE 2. A handle 35 is provided on cover plate 33 to enable the cover plate to be manually moved along the guide bars 34, 34.

The flexible side walls 26, 26 are provided at their upper portions with windows 36 of flexible transparent material.

Designated at 37 is a rigid rectangular auxiliary floor plate member which is hingedly connected at 38 to the truck floor 13 at a location rearwardly adjacent the normal location of the hinged rear wall member 17 of the cab. Hinged at 39 to the rear edge of floor plate 37 is a transverse bar 40. Hinged at 42 to the rear transverse edge of bar 40, as viewed in FIGURE 2, is a rigid seat back plate 41 on which is secured a seat back cushion 43. The side marginal portions of the seat back plate 41 are provided with apertured lugs 44 which are detachably secured to the truck side walls 14 by bolts 52 extending through apertures 45 provided in said truck body side walls 14, so that the seat back plate 41 may be detachably secured in an upwardly and rearwardly inclined position, as shown in FIGURE 2, with the main auxiliary floor plate 37 and the flat bar 40 resting on the truck floor 13. Designated at 46 is an auxiliary seat provided at its forward corners with pivoted legs 47 and at its rear edge with inclined lugs 48. The legs 47 may be swung to depending positions and may be engaged in socket recesses 49 provided in floor plate 37, and the lugs 48 are engageable in suitable apertures provided in back plate 41, whereby to support the auxiliary seat 46 in a substantially horizontal position forwardly of and subjacent the seat back cushion 43, as shown in FIGURE 2.

When the truck is to be employed for hauling freight, the slide fasteners 28, 28 are unfastened and the rods 23 are telescoped into the tubular members 22. The seat 46 is disposed adjacent the front seat 16 over the gas tank 50, and the member 41 is folded to overlie the floor plate 37. The wall member 17 is allowed to swing downwardly to its vertical position, the members 22 being swung to positions adjacent and parallel to wall member 17. The flexible wall members 26, 26 and 29 are folded up inwardly so as to be received inside the cab 12 adjacent the rear wall member 17, the folded flexible rear wall 29 being received adjacent the vertically disposed auxiliary seat 46, as shown in FIGURE 3. The members 37, 40 and 41 are then swung upwardly to a position rearwardly adjacent the wall member 17 and are secured in this position by any suitable detachable fastening means.

To reconvert the truck to carry passengers, the above procedure is reversed, whereby to provide the auxiliary passenger compartment illustrated in FIGURES 1 and 2. Passengers may enter or leave the auxiliary compartment by swinging the backs 16 of the front seats forwardly, as in the case of a conventional two-door sedan, so as to provide clearance for entry into or for leaving said auxiliary compartment.

In the modification illustrated in FIGURE 6, the rear wall, shown at 17' is shortened, as compared with FIGURES 1 to 5, and a cooperating bottom flap 60 is provided, said bottom flap being hinged at 61 transversely to the floor 13. The bottom flap 60 is of sufficient height to cover the space between floor 13 and the bottom edge of rear wall 17' when the parts are in their folded positions, as shown in FIGURE 6. When the parts are unfolded to provide the auxiliary passenger compartment, the bottom flap 60 may be swung rearwardly to a substantially horizontal position parallel and adjacent to the floor 13.

The relative dimensions of the member 17' and the bottom flap 60 are preferably such that the bottom flap in its upright position constitutes about one fifth of the cab rear wall, while the member 17' constitutes about four fifths of the cab rear wall, with the parts arranged as in FIGURE 6.

While a specific embodiment of a convertible pick-up truck has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a pick-up truck having a body including a horizontal truck floor, rigid side walls secured to the side margins of said floor, and a cab enclosure with side doors and a front seat positioned adjacent the forward end of the floor, a rigid rear wall hinged to the rear transverse edge of the cab roof and normally depending vertically from said rear transverse edge; a number of telescopic supporting posts hinged to the lower corner portions of the said rear wall, the said posts being foldable to a spaced and substantially parallel position in relation to the said rear wall, a number of socket members in the truck floor spaced rearwardly from the cab, the said rigid rear wall being swingable to a position extending rearwardly from said roof and in substantial horizontal alignment therewith, the free ends of the said supporting posts being engageable in said socket members to support the said rigid rear wall, a flexible wall member secured to each of the free edges of the said rigid rear wall and depending vertically therefrom when the said rigid rear wall is supported on said posts providing flexible side and rear walls to define an auxiliary passenger compartment and slide fastener assemblies arranged to connect the rear edges of the flexible walls to the side edges of the rigid rear wall to the opposite side edges of the flexible wall connected to the free transverse edge of the rigid rear wall.

2. The structure of claim 1 wherein the slide fastener assemblies are located vertically and inwardly adjacent to the said supporting posts.

3. In a pick-up truck having a body including a horizontal truck floor, rigid side walls secured to the side margins of said floor and a cab enclosure with side doors and a front seat, positioned adjacent the forward end of the floor, a rigid rear wall hinged to the rear transverse edge of the cab roof and normally depending vertically from said rear transverse edge, the said rear wall being provided with a window, a number of parallel track bars secured to the said rear wall, and an opaque cover plate between the said track bars, a number of telescopic supporting posts hinged to the lower corner portions of the said rear wall, the said posts being foldable to a spaced and substantially parallel position in relation to the said rear wall, a number of socket members in the truck floor spaced rearwardly from the cab, the said rigid rear wall being swingable to a position extending rearwardly from said roof and in substantial horizontal alignment therewith, the free ends of the said supporting posts being engageable in said socket members to support the said rigid rear wall, a flexible wall member secured to each of the free edges of the said rigid rear wall and depending vertically therefrom when the said rigid rear wall is supported on said posts providing flexible side and rear walls to define an auxiliary passenger compartment.

4. The structure of claim 3 wherein the said parallel track bars secured to the said rear wall are positioned on opposite sides of said window, and the said opaque cover plate is slidably engaged between the said track bars.

5. In a pick-up truck having a body including a horizontal truck floor, rigid side walls secured to the side margins of said floor, and a cab enclosure with side doors and a front seat positioned adjacent the forward end of the floor, a rigid rear wall hinged to the rear transverse edge of the cab roof and normally depending vertically from said rear transverse edge, a number of telescopic supporting posts hinged to the lower corner portions of the said rear wall, the said posts being foldable to a spaced and substantially parallel position in relation with the said rear wall, a number of socket members in the truck floor spaced rearwardly from the cab, the said rigid rear wall being swingable to a position extending rearwardly from said roof and in substantial horizontal alignment therewith, the free ends of the said supporting posts being engageable in said socket members to support the said rigid rear wall, and a flexible wall member secured to each of the free edges of the said rigid rear wall and depending vertically therefrom when the said rigid rear wall is supported on said posts providing flexible side and rear walls to define an auxiliary passenger compartment, the said flexible wall members being receivable inside the truck's rigid side walls, and include means to detachably secure the flexible wall members to the said rigid walls.

6. In a pick-up truck having a body including a horizontal truck floor, rigid side walls secured to the side margins of said floor, and a cab enclosure with side doors and a front seat positioned adjacent the forward end of the floor, a rigid rear wall hinged to the rear transverse edge of the cab roof and normally depending vertically from said rear transverse edge, a number of telescopic supporting posts hinged to the lower corner portions of the said ear wall, the said posts being foldable to a spaced and substantially parallel position in relation with the said rear wall, a number of socket members in the truck floor spaced rearwardly from the cab, the said rigid rear wall being swingable to a position extending rearwardly from said roof and in substantial horizontal alignment therewith, the free ends of the said supporting posts being engageable in said socket members to support the said rigid rear wall, a flexible wall member secured to each of the free edges of the said rigid rear wall and depending vertically therefrom when the said rigid rear wall is supported on said posts providing flexible side and rear walls to define an auxiliary passenger compartment, the rear marginal portions of said flexible walls being adapted to extend around the supporting posts when said posts are in upright position.

7. In a pick-up truck having a body including a horizontal truck floor, rigid side walls secured to the side margin of said floor, and a cab enclosure with side doors and a front seat positioned adjacent the forward end of the floor, a rigid rear wall hinged to the rear transverse edge of the cab roof and normally depending vertically from said rear transverse edge, the said rear wall being provided with a window, a number of parallel opposing track bars secured to the said rear wall on opposite sides of said window and an opaque cover plate slidably engaged between said track bars, a number of telescopic supporting posts hinged to the lower corner portions of the said rear wall, said posts being foldable to a spaced and substantially parallel position in relation to the said rear wall, a number of socket members in the truck floor spaced rearwardly from the cab, the said rigid rear wall being swingable to a position extending rearwardly from said roof and in substantial horizontal alignment therewith, the free ends of the said supporting posts being engageable in said socket members to support the said rigid rear wall, a foldable auxiliary seat member hinged to the truck floor rearwardly adjacent the normal depending position of the said rear wall and normally disposed in a folded condition rearwardly adjacent the said rear wall, a flexible wall member secured to each of the free edges of the said rigid rear wall and depending vertically therefrom when the said rigid rear wall is supported on said posts providing flexible side and rear walls to define an auxiliary passenger compartment, said flexible wall members being receivable inside the truck's rigid side walls and including means to detachably secure the said flexible wall members to said truck rigid side walls, the said flexible side wall members having marginal portions connected to the side edges of the rigid rear wall adapted to extend around the said supporting posts when said supporting posts are in upright positions, and a number of slide fastener assemblies located vertically and inwardly adjacent to the said supporting posts and arranged to connect the rear edges of the flexible walls to the side edges of the rigid rear wall and to the opposite side edges of the flexible wall connected to the free transverse edge of the rigid rear wall.

References Cited in the file of this patent

UNITED STATES PATENTS

| 1,322,896 | Goennel | Nov. 25, 1919 |
| 2,496,055 | King | Jan. 31, 1950 |
| 2,971,794 | Garcia | Feb. 14, 1961 |

FOREIGN PATENTS

| 351,198 | Great Britain | June 25, 1931 |